United States Patent Office 2,920,996
Patented Jan. 12, 1960

2,920,996

METHOD OF KILLING FUNGI COMPRISING CONTACTING SAID FUNGI WITH A 2-THIOTETRAHYDROTHIAZINE

Henry Bluestone, Cleveland Heights, Ohio, assignor to Diamond Alkali Company, Cleveland, Ohio, a corporation of Delaware No Drawing. Application September 3, 1954
Serial No. 454,219

8 Claims. (Cl. 167—33)

This invention relates to biologically active materials, and more particularly relates to improved fungicidal compositions effective as fungicides and to methods for their use.

The many varieties of fungi falling within the broad classification Thallophyta and subclasses Phycomycetes, Ascomycetes, Basidomycetes, and Fungi imperfecti, and related parasitical organisms, annually cause extensive damage, both in the destruction of and injury to plants, and in many non-agricultural applications where mold, mildew, and the like are encountered. Up to the present time, although many compositions have been proposed and used in an effort to control fungi, annual losses due to fungi make the problem of fungus control a serious and continuing one.

It is a principal object of this invention to provide improved fungicidal compositions and methods for their use.

A further object of the invention is the provision of novel compositions of biologically active materials.

These and other objects and advantages of the invention will appear more fully from the following description.

The expression "fungicidal material," as used in the specification and claims, is intended to mean compositions useful in the control of fungi broadly and to include not only those instances wherein fungi are killed, but also where the germination of fungus spores is inhibited.

The practice of this invention contemplates the use as a biologically active ingredient of a compound having the following formula:

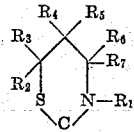

wherein $R_1$, $R_2$, $R_3$, $R_4$, $R_5$, $R_6$, and $R_7$ are radicals selected from the group consisting of hydrogen; alkyl radicals, such as methyl, ethyl, propyl, butyl, and isomers thereof; aryl radicals, such as phenyl and naphthyl; alkaryl radicals, such as tolyl and xylyl; aralkyl radicals, such as benzyl and phenethyl, and alkoxy radicals, such as methoxy, ethoxy, and the like.

Illustrative of compounds of the above type and within the scope of the invention are the following:

2-thiotetrahydrothiazine,
6-methyl-2-thiotetrahydrothiazine,
6-methyl-2-sec. butyl-2-thiotetrahydrothiazine,
3-sec. butyl-2-thiotetrahydrothiazine,
3-methyl-2-thiotetrahydrothiazine,
3-ethyl-2-thiotetrahydrothiazine,
3-isopropyl-2-thiotetrahydrothiazine,
3-phenyl-2-thiotetrahydrothiazine,
3-benzyl-2-thiotetrahydrothiazine,
3-cyclohexyl-2-thiotetrahydrothiazine,
3-p-chlorobenzyltetrahydrothiazine,
3-nonadecyl-2-thiotetrahydrothiazine,
3-p-methoxybenzyl-2-thiotetrahydrothiazine,
3-phenethyl-2-thiotetrahydrothiazine, and
3-tolyl-2-thiotetrahydrothiazine.

In preventing or minimizing fungus growth on plants, fruits, seeds, soils, and in other agricultural applications, as well as similar growths on fur, leather, cotton, wood, and organic materials in general, compositions of the present invention may be employed as finely-divided dry materials, liquid sprays, and drenching or immersing materials, either for direct application or as soil additives, the particular form being dictated by the application intended. The term "soil," as used herein, is intended to include any substance or medium capable of supporting the growth of plants. It is therefore intended to include, in addition to soil, humus, manure, compost, sand, and artificially-created plant growth media including solutions and/or other hydroponic media.

In those instances where a finely-divided dust composition is desired it will be understood, of course, that suitable inert or active fillers, inert or active extenders, or carriers, including such materials as pyrophillite, diatomaceous earth, talc, clay, etc. may be utilized. If desired, compounds of the present invention may also be embodied in fungicidal dusts in combination with other active ingredients, including defoliants, fertilizers, insecticides, and the like.

When a liquid composition is desired, compounds of this invention may be formulated into compositions utilizing various solvents, diluents, extenders, and the like, such as water, aromatic and aliphatic organic liquids, such as acetone, benzene, and/or various alcohols, ethers, ketones, and the like, as well as various petroleum fractions.

Compositions embodying the invention may be utilized in agricultural applications by well-known methods familiar to those skilled in the art, including spraying, dusting, drenching, immersing, and the like. Moreover, in many instances, the fungicidal activity of the present compounds render them useful as seed protectants.

Broadly stated, thus, the present invention contemplates the use of compositions which include as active materials substituted and unsubstituted 2-thiotetrahydrothiazines and/or mixtures thereof.

In general, compounds of the invention may be prepared by a process which comprises reacting a substituted or unsubstituted 1,3-amino alcohol with carbon disulfide to form the corresponding 2-thiotetrahydrothiazine. It will be recognized, of course, that by proper selection of the 1,3-amino alcohol, i.e., with regard to its constituents, or lack of constituents, a variety of 2-thiotetrahydrothiazines can be prepared. In certain applications the active compounds employed in the practice of this invention need not be isolated and purified, although a water-washing of the crude product is frequently advantageous. Purification is generally carried out only to the extent necessary for removing by-products and impurities which otherwise would adversely affect the reaction yield or material to be treated.

In order that those skilled in the art may more completely understand this invention and the preferred method by which it may be carried into effect, the following specific examples of the preparation and biological activity of compounds embodying the invention are offered:

EXAMPLE I

Part A

*Preparation of 2-thiotetrahydrothiazine.*—Into a 2-liter, 3-neck, round-bottom flask equipped with a stirrer, thermometer, and a dropping funnel are introduced 160 gms. of sodium hydroxide, 450 ml. of distilled water, and 0.5 gm. of Ultra-Wet D.S. (alkyl benzene sodium sulfonate). The flask and its contents are then cooled to a temperature of 5° C., at which time 152 gms. of 3-aminopropanol is added slowly with stirring. To the continuously stirred reaction mixture 152 gms. of carbon disulfide is then added dropwise over a period of 105 minutes, while the temperature is kept between 5° and 10° C.

After all of the carbon disulfide is added, stirring is continued for 2 hours, while the temperature of the reaction mass is allowed to rise slowly to room temperature. The reaction mixture becomes blood red in color and is then refluxed for 8 hours at a temperature of about 45° C. and then heated for an additional 16 hours at a temperature of about 100° C. The reaction mixture is cooled and allowed to stand, whereupon a solid separates. The mixture is then partially neutralized with 210 ml. of concentrated hydrochloric acid and a solid product is collected by filtration. The purified product, recrystallized from isopropyl alcohol, has a melting point of 133° to 135° C. The following analysis of the purified product indicates the composition $C_4H_7NS_2$:

| Constituent | Percent Calculated | Percent Actual |
|---|---|---|
| C | 36.06 | 36.49 |
| H | 5.30 | 5.49 |
| S | 48.13 | 47.62 |

Part B

To illustrate the fungicidal effectiveness of the product of Part A, experiments are conducted against early blight (*Alternaria solani*) as an aqueous spray on tomato foliage at concentrations in parts per million of 2000 and 400. The percent control of the early blight at these concentrations is 99% and 84%, respectively. Similar tests are conducted against snapdragon rust (*Puccinia antirrhini*) at concentrations in parts per million of 2000, 400, 200, and 40. Indexed comparatively, the percent control at these concentrations is 100%, 100%, 85%, and 72%, respectively.

EXAMPLE II

Part A

*Preparation of 6-methyl-2-thiotetrahydrothiazine.*—Into a 3-neck, round-bottom flask equipped with a thermometer, a dropping funnel, and stirrer are introduced 160 gms. of sodium hydroxide dissolved in 450 ml. of distilled water and 1 gm. of a wetting agent (Ultra-Wet D.S.). The flask and its contents are then placed in an ice bath to reduce the temperature of the mixture to 5° C., at which time 89 gms. of 4-amino-2-butanol and 152 gms. of carbon disulfide are added, the carbon disulfide being added dropwise over a period of 130 minutes, while the reaction temperature is maintained between 5° and 10° C.

During the reaction, the color changes from colorless through orange to red. The reaction mixture is heated for 8 hours at about 45° C. and for 4 hours at 90° C. and allowed to cool to room temperature. The solid which separates is removed by filtration and weighs 73 gms. An excess of isopropyl alcohol is added to the solid and the mixture is boiled for 15 minutes to extract the product from the $Na_2CO_3$ formed. The isopropyl alcohol is then filtered and partially evaporated. The product which separates from this partially evaporated isopropyl alcohol is recrystallized three times from isopropyl alcohol to obtain a product having a melting point of 124° to 125.5° C. The following analysis of this purified product indicates the composition $C_5H_8S_2N$:

| Constituent | Percent Calculated | Percent Actual |
|---|---|---|
| C | 40.78 | 40.90 |
| H | 6.16 | 6.03 |

Part B

To illustrate the fungicidal effectiveness of the product of Part A, experiments are conducted against early blight (*Alternaria solani*) as an aqueous spray on tomato foliage at concentrations in parts per million of 2000, 400, 200, 40, and 8. Indexed comparatively, the percent control at these concentrations is 98%, 96%, 87%, 74%, and 33%, respectively. Similar tests are conducted against snapdragon rust (*Puccinia antirrhini*) at concentrations in parts per million of 1000, 400, 200, 80, and 16. The percent control at these concentrations is 100%, 97%, 91%, 80%, and 66%, respectively.

EXAMPLE III

Part A

*Preparation of 6-methyl-3-sec. butyl-2-thiotetrahydrothiazine.*—Into a 500 ml. 3-neck, round-bottom flask equipped with a stirrer, thermometer, and a dropping funnel are introduced 88 gms. of sodium hydroxide dissolved in 300 ml. of water. The contents of the flask are then cooled in an ice bath to 5° C. and 79.75 gms. of 4-(N-sec. butyl)-amino-2-butanol are added together with 0.5 gm. of a wetting agent (Ultra-Wet K). Continuing the cooling and stirring, 83.6 gms. of carbon disulfide is added dropwise over a period of one hour. The reaction mixture is allowed to warm to room temperature and is heated with stirring for 4 hours at 45° C. and for 2 hours at 85° C. The reaction mass is then cooled, whereupon a solid separates. The solid product is obtained by filtration and is recrystallized twice from isopropyl alcohol to produce a white solid melting at 113° to 115° C. and having the following chemical analysis:

| Constituent | Percent Calculated | Percent Actual |
|---|---|---|
| C | 53.2 | 53.6 |
| H | 8.38 | 9.9 |
| N | 6.9 | 7.5 |

Part B

To illustrate the fungicidal effectiveness of the product of Part A, experiments are conducted against early blight (*Alternaria solani*) as an aqueous spray on tomato foliage at concentrations in parts per million of 2000 and 400. The percent control of the early blight at these concentrations is 72% and 56%, respectively.

EXAMPLE IV

Part A

*Preparation of 3-sec. butyl-2-thiotetrahydrothiazine.*—Into a 2-liter, 3-neck, round-bottom flask equipped with a stirrer, thermometer, and dropping funnel are introduced 240 gms. of sodium hydroxide dissolved in 600 ml. of water, and 0.5 gm. of a wetting agent (Ultra-Wet D.S.). The flask contents are then cooled to 5° C., at which time 175.5 gms. of N-isopropyl-3-aminopropanol is added. Continuing cooling and stirring at 5° C., 228 gms. of carbon disulfide is added dropwise over a period of 90 minutes. The reaction mixture is allowed to warm to room temperature and is thereafter heated for 4 hours at 45° C. and for 4 hours at 80° C. The reaction mass is then cooled to room temperature and a solid product removed by filtration. The product is washed with distilled water and recrystallized twice from isopropyl alcohol to obtain white crystals melting at 99° to 100° C. and having the following analysis:

| Constituent | Percent Calculated | Percent Actual |
|---|---|---|
| C | 47.96 | 48.05 |
| H | 7.47 | 7.65 |
| N | 7.99 | 8.67 |

Part B

To illustrate the fungicidal effectiveness of the product of Part A, experiments are conducted against the early blight (*Alternaria solani*) as an aqueous spray on tomato foliage in concentrations in parts per million at 2000 and 400. The percent control of the early blight at these concentrations is 90% and 27%, respectively.

While the foregoing examples have been illustrative of the compounds of the present invention in foliage applications, it will be understood, of course, that these compounds, as well as various compositions containing these and other compounds embodying the present invention, are effective when applied in a direct manner, as by spraying, sprinkling, or drenching, or by dusting with a dry material containing a compound of the present invention as an active ingredient, or by applying a slurry containing a compound of the present invention as an active ingredient.

It will be understood, of course, that compounds embodying the present invention may be employed either alone or in mixtures containing one or more of the compounds as active ingredients, with or without small amounts of wetting agents being added.

Typical of suitable wetting agents which may be employed are the following commercially available tradename products: Igepal CO–880 (alkyl phenoxypolyoxyethylene ethanol), Arquad 2–C (quaternary ammonium compound of the formula $RR'-N-(CH_3)_2Cl$), Emulphor ON–870 (polyoxyethylated fatty alcohol), Tween 80 (polyoxyethylene sorbitan monooleate), Triton X–155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F–68 (condensate of ethylene oxide with an hydrophobic base formed by condensing propylene oxide with propylene glycol), Antarox A–400 (alkyl phenoxypolyoxyethylene ethanol), Triton X–120 (alkyl aryl polyether alcohol), Nacconol NRSF (alkyl aryl sulfonate), Aresol OS (isopropyl naphthylene sodium sulfonate), Span 40 (sorbitan monopalmitate), Triton B–1956 (modified phthalic glycerol alkyd resin), and Antarox B–290 (polyoxyethylated vegetable oil). At present, a preferred wetting agent is the non-ionic material Igepal CO–880, employed in an amount of about 0.1% by weight.

Although compounds embodying the present invention may be employed as wettable powders, with or without diluents and/or extenders or other modifying ingredients, including such materials as insecticides or other plant treating agents, a typical application utilizes compounds of the present invention in the form of a liquid spray. In such a spray material water is, of course, a satisfactory liquid, although other liquids, including various organic liquids, also may be employed.

While there have been described various embodiments of the invention, the methods and products described are not intended to be understood as limiting the scope of the invention, as it is realized that changes therewithin are possible, it being intended to cover the invention broadly in whatever form its principle may be utilized.

What is claimed is:

1. The method of treating fungus-infected plants which includes the step of applying to said plants a plant treating amount of a compound having the formula:

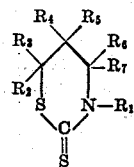

wherein $R_1$, $R_2$, $R_3$, $R_4$, $R_5$, $R_6$, and $R_7$ are radicals selected from the group consisting of hydrogen, alkyl, aryl, alkaryl, aralkyl, and alkoxy radicals.

2. The method of treating fungus-infected plants which includes the step of applying to the soil in which said plants are growing a plant treating amount of a compound having the formula:

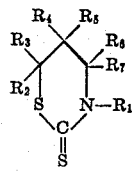

wherein $R_1$, $R_2$, $R_3$, $R_4$, $R_5$, $R_6$, and $R_7$ are radicals selected from the group consisting of hydrogen, alkyl, aryl, alkaryl, aralkyl, and alkoxy radicals.

3. The method of controlling fungus growth which includes the step of contacting a material upon which fungus growth is to be controlled with a fungicidal amount of a composition containing a compound having the formula:

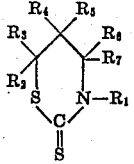

wherein $R_1$, $R_2$, $R_3$, $R_4$, $R_5$, $R_6$, and $R_7$ are radicals selected from the group consisting of hydrogen, alkyl, aryl, alkaryl, aralkyl, and alkoxy radicals.

4. The method of killing fungi which comprises contacting said fungi with a fungicidal amount of a compound of the structure:

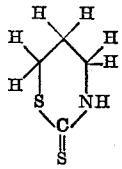

5. The method of killing fungi which comprises contacting said fungi with a fungicidal amount of a compound of the structure:

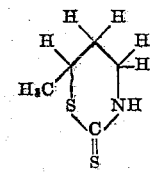

6. The method of killing fungi which comprises contacting said fungi with a fungicidal amount of a compound of the structure:

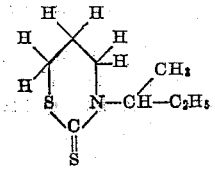

7. The method of killing fungi which comprises contacting said fungi with a fungicidal amount of a compound of the structure:

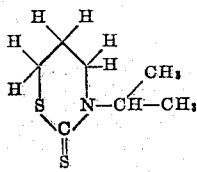

8. The method of killing fungi which comprises contacting said fungi with a fungicidal amount of a compound having the structure:

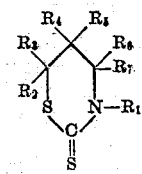

wherein $R_1$ is selected from the group consisting of alkyl, aryl, alkaryl, aralkyl, and alkoxy radicals, and $R_2$, $R_3$, $R_4$, $R_5$, $R_6$, and $R_7$ are radicals selected from the group consisting of hydrogen, alkyl, aryl, alkaryl, aralkyl, and alkoxy radicals.

References Cited in the file of this patent
UNITED STATES PATENTS

| | | |
|---|---|---|
| 2,086,186 | Messer | July 6, 1937 |
| 2,170,059 | Mathes | Aug. 22, 1939 |
| 2,345,208 | Mathes | Mar. 28, 1944 |
| 2,391,993 | Mathes | Jan. 1, 1946 |
| 2,547,682 | Baumgartner | Apr. 3, 1951 |
| 2,651,630 | Downey | Sept. 8, 1953 |
| 2,656,354 | Mathes et al. | Oct. 20, 1953 |
| 2,783,229 | Tumes | Feb. 26, 1957 |
| 2,832,680 | Goenaga | Apr. 29, 1958 |

OTHER REFERENCES

King: U.S. Dept. of Agr., Handbook 69, May 1954, p. 323.

Beilstein's Handbuch der organischen Chemie (1938), Erstes Ergänzungswerk, vol. 27, p. 260.

McNew: "Agri. Chems." (April 1952), pp. 54–6.